United States Patent
Derocher et al.

(10) Patent No.: US 8,363,088 B2
(45) Date of Patent: Jan. 29, 2013

(54) TELEPRESENCE DISPLAY CONFIGURATION

(75) Inventors: Mike Derocher, Albany, OR (US);
Mark E Gorzynski, Corvallis, OR (US);
Mark Prommel, Brooklyn, NY (US);
Wilfrido Loor Canizares, Brooklyn, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1125 days.

(21) Appl. No.: 12/263,329

(22) Filed: Oct. 31, 2008

(65) Prior Publication Data

US 2009/0231412 A1 Sep. 17, 2009

Related U.S. Application Data

(60) Provisional application No. 61/037,282, filed on Mar. 17, 2008.

(51) Int. Cl.
*H04N 7/14* (2006.01)
(52) U.S. Cl. .................................................. 348/14.08
(58) Field of Classification Search ............... 348/14.08
See application file for complete search history.

(56) References Cited

U.S. PATENT DOCUMENTS

| | | | | |
|---|---|---|---|---|
| 7,063,217 B2 * | 6/2006 | Burke | | 211/59.3 |
| 7,679,639 B2 * | 3/2010 | Harrell et al. | | 348/14.08 |
| 2005/0047617 A1 * | 3/2005 | Lee | | 381/306 |
| 2006/0002102 A1 * | 1/2006 | Leonard | | 362/96 |
| 2006/0150462 A1 * | 7/2006 | Rossi | | 40/700 |

* cited by examiner

*Primary Examiner* — Alexander Jamal (57) ABSTRACT

Telepresence display configuration useful for video conferencing. The telepresence display configurations include a video display and a mat. The mat is spaced apart from the video display and has an opening having an inner perimeter configured to frame a viewing surface of a video display.

20 Claims, 7 Drawing Sheets

FIG. 5

TELEPRESENCE DISPLAY CONFIGURATION

CROSS-REFERENCE TO RELATED APPLICATIONS

This Application claims the benefit of U.S. Provisional patent application Ser. No. 61/037,282, filed Mar. 17, 2008, which is hereby incorporated by reference in it's entirety.

BACKGROUND

Video conferencing is an established method of simulated face-to-face collaboration between remotely located participants. A video image of a remote environment is broadcast onto a local display, allowing a local user to see and talk to one or more remotely located participants.

Social interaction during face-to-face collaboration is an important part of the way people work. There is a need to allow people to have effective social interaction in a simulated face-to-face meeting over distance.

Telepresence systems are used to create large images of remote locations for video conferencing. They generally include one or more cameras for capturing an image, a video display for viewing images from other locations, and a work space for seating and activities of the conference participants. Because the telepresence systems are largely responsible for the image provided to other participants, their design is crucial to effective interaction.

For the reasons stated above, and for other reasons that will become apparent to those skilled in the art upon reading and understanding the present specification, there is a need in the art for alternative telepresence display configurations.

DETAILED DESCRIPTION

In the following detailed description of the present embodiments, reference is made to the accompanying drawings that form a part hereof, and in which is shown by way of illustration specific embodiments of the disclosure which may be practiced. These embodiments are described in sufficient detail to enable those skilled in the art to practice the subject matter of the disclosure, and it is to be understood that other embodiments may be utilized and that process or mechanical changes may be made without departing from the scope of the present disclosure. The following detailed description is, therefore, not to be taken in a limiting sense, and the scope of the present disclosure is defined by the appended claims and equivalents thereof.

The various embodiments involve telepresence display configurations including at least one video display. A surround or mat is overlying and spaced apart from the video display and has an opening having an inner perimeter configured to frame a viewing surface of a video display. Upper and lower edges of the mat may recede toward a background or mounting surface for the video display. This pushes the mat visually off a center portion of a background surface, such as a media wall, promoting the appearance that the video display is floating in front of the media wall. Upper and lower portions of the media wall may also extend forward of the video display, further enhancing this effect.

Figure 1:
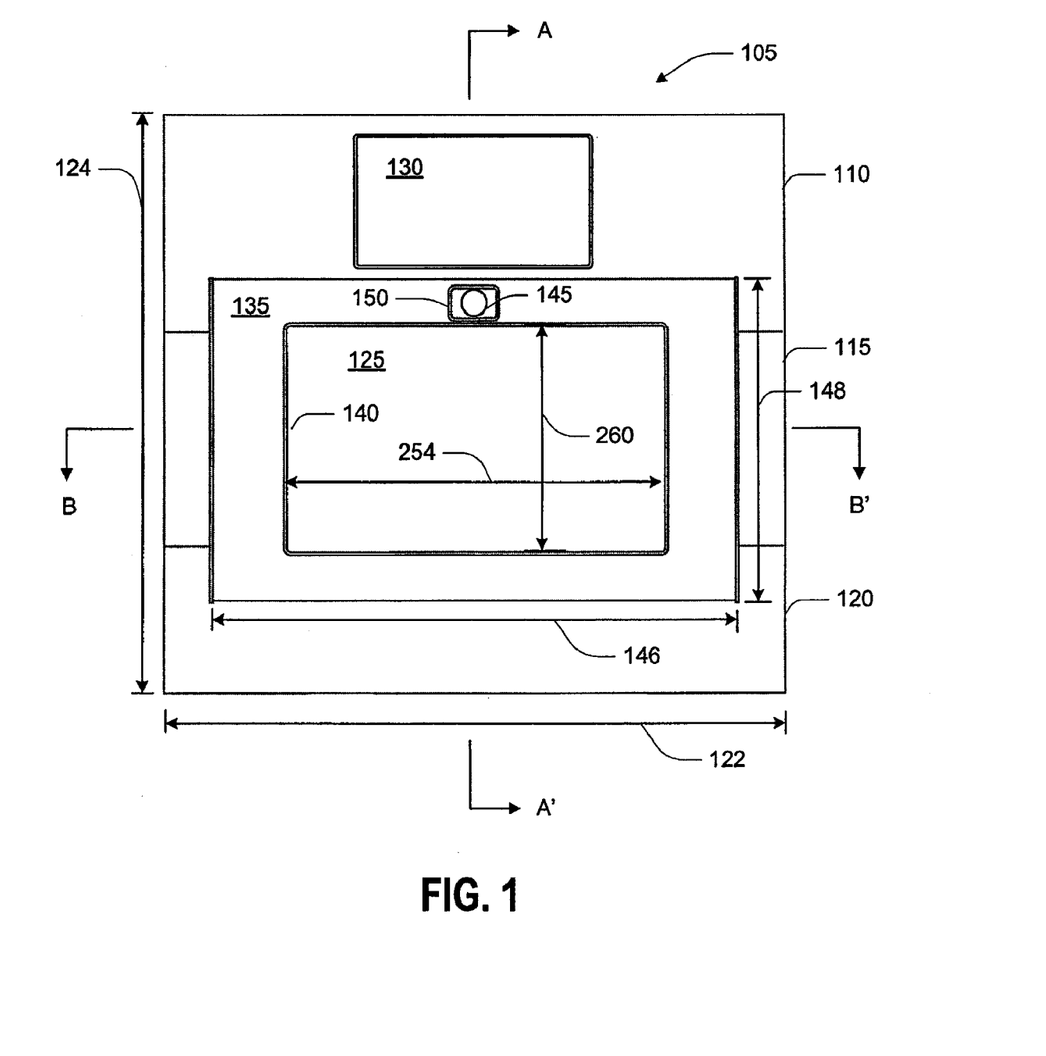
FIG. 1 is a frontal view of a telepresence display configuration in accordance with an embodiment.

FIG. 1 is a frontal view of a telepresence display configuration in accordance with an embodiment. The telepresence display configuration of FIG. 1 includes a media wall 105 serving as a background surface and mounting structure for a video display. However, the video display 125 may be simply positioned in front of a background surface. For example, the video display 125 may be mounted to a stand or ceiling mount. The media wall 105 may further be sub-divided to include an upper portion 110, a center portion 115 and a lower portion 120. The media wall has a width 122 and a height 124.

The media wall 105 includes a video display 125 positioned in front of the center portion 115. The media wall 105 may further include one or more optional video displays 130. For example, video display 125 could be used for the display of remote participants of a video conference while video display 130 could be used for the display of other information, such as physical location of remote participants, ordering of remote locations as displayed in video display 125, or shared data, such as white boards or other data structures.

A mat 135 is positioned in front of the video display 125 and has an inner perimeter 140 defining an opening to frame the video display 125 and permit viewing of its viewing surface or screen. The opening for the video display 125 has a width 142 and a height 144. The mat 135 further has a width 146 and a height 148. The mat 135 may further include an opening 150 for a camera 145 for capturing images of participants seated in front of the media wall 105. The width 146 of the mat 135 is greater than a width of the video display 125 in order to conceal the exterior edges (not shown in FIG. 1) of the video display 125. For one embodiment, the width 146 is between 1.2 and 1.5 times the width 142 to aid the appearance of pulling an image of the video display 125 to the foreground. The height 148 of the mat 135 is greater than a height of the video display 125 in order to conceal the exterior edges of the video display 125 and to extend beyond any camera 145 positioned above the video display 125. For one embodiment, height 148 is between 1.3 and 1.6 times the height 144 to aid the appearance of pulling an image of the video display 125 to the foreground. Similarly, the width 122 and height 124 of the media wall 105 are larger than the width 146 and height 148 of the mat 135, respectively, to provide a receding background for the display 125. For one embodiment, height 124 is between 1.6 and 2 times the height 148 and width 122 is between 1.1 and 1.5 times the width 146.

Figure 2:
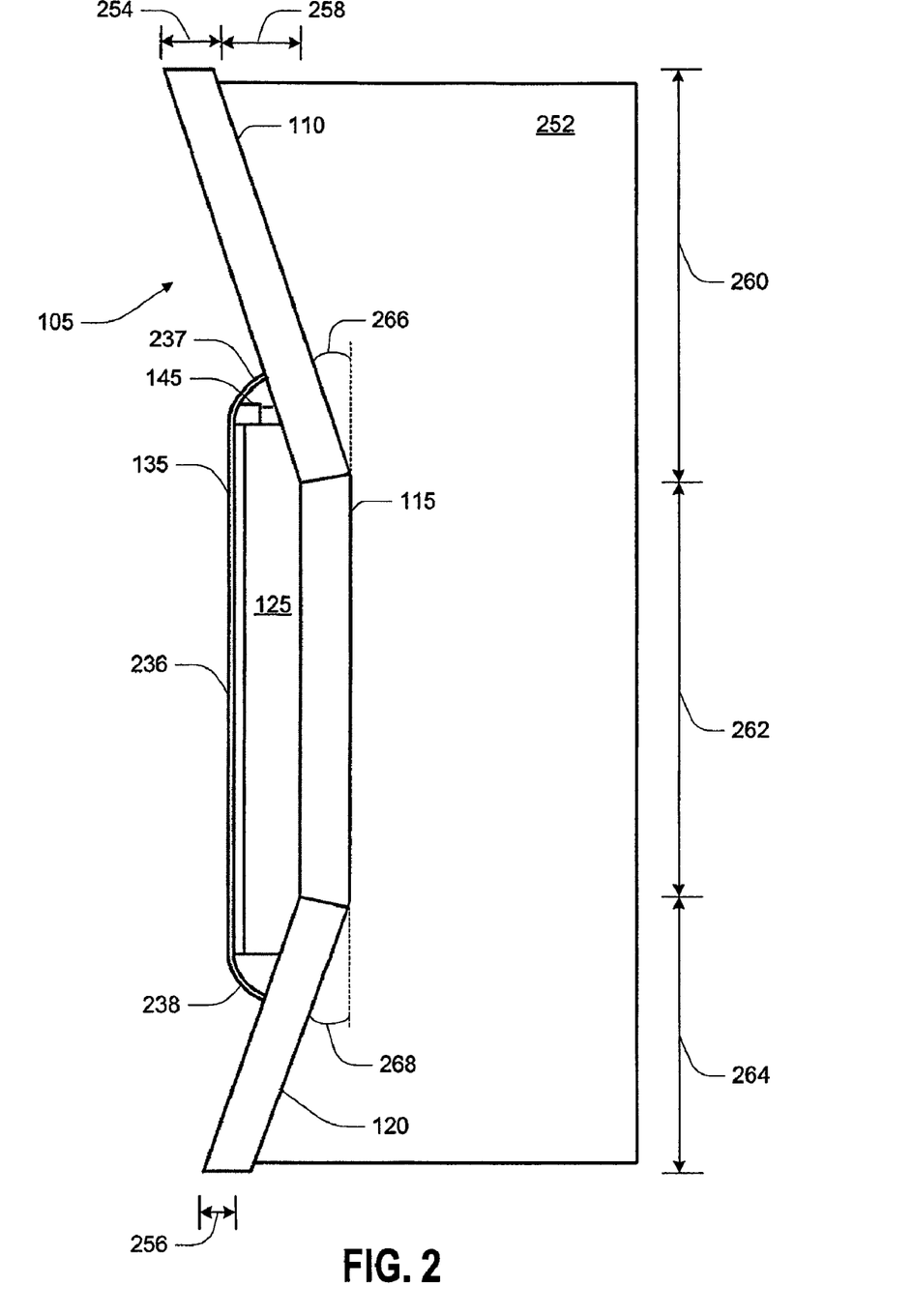
FIG. 2 is a side view of the telepresence display configuration of FIG. 1.

FIG. 2 is a side view of the telepresence display configuration of FIG. 1. As shown in FIG. 2, the media wall 105 may further include a housing 252. Housing 252 may be used to contain and conceal electronics for the functioning and control of the video display 125, the one or more additional video displays 130 and camera 145. The housing 252 may further provide support for the media wall 105 to facilitate a self-standing structure. Alternatively, the media wall 105 could be mounted on some other support structure, such as a building wall or the like.

The upper portion 110 and lower portion 120 of the media wall 105 each extend forward from the center portion 115. For one embodiment, the upper portion 110 and lower portion 120 each extend forward of the mat 135. The upper portion 110 extends a distance 254 forward of a face 236 of the mat 135 and the lower portion 120 extends a distance 256 forward of the face 236 of the mat 135. The face 236 of the mat 135 extends a distance 258 in front of the center portion 115 of the media wall 105. For one embodiment, the distance 254 is between 0.6 and 0.9 times the distance 258. For another embodiment, the distance 256 is between 0.3 and 0.6 times the distance 258.

An upper edge 237 of the mat 135 may recede toward the background surface for the video display 125. As depicted in FIG. 2, the upper edge 237 recedes toward the upper portion 110 of the media wall 105. For one embodiment, the upper edge 237 is in contact with the upper portion 110. The upper edge 237 as depicted in FIG. 2 recedes in a generally curvilinear fashion to suppress visual clues to a viewer of a transition of the upper edge 237. A lower edge 238 of the mat 135 may recede toward the background surface for the video display 125. As depicted in FIG. 2, the lower edge 238 recedes toward the lower portion 120 of the media wall 105. For one embodiment, the lower edge 238 is in contact with the lower portion 120. The lower edge 238 as depicted in FIG. 2 recedes in a generally curvilinear fashion to suppress visual clues to a viewer of a transition of the lower edge 238. However, the mat 135 could alternatively eliminate the receding edges 237/238 and merely provide a height 148 and width 146 extending beyond edges of the video display 125 and camera 145.

The upper portion 110 of the media wall 105 has a height 260, while the center portion 115 has a height 262 and the lower portion 120 has a height 264. For one embodiment, the height 260 is greater than the height 264. For a further embodiment, the height 260 is between 1.4 and 1.6 times the height 264. For another embodiment, the height 260 is approximately equal to the height 262.

Optionally, the upper portion 110 may extend forward of the mat 135 by inclining from the center portion 115 by an acute angle 266. For one embodiment, the angle 266 is approximately 100 to 300. For a further embodiment, the angle 266 is approximately 20°. Optionally, the lower portion 120 may extend forward of the mat 135 by inclining from the center portion 115 by an acute angle 268. For one embodiment, the angle 268 is approximately 10° to 30°. For a further embodiment, the angle 268 is approximately 20°. Although media wall 105 is depicted to have upper portion 110 and lower portion 120 extending forward of the mat 135, such portions could be inclined at lesser angles to extend toward, but nor forward, of the mat 135, and the media wall 105 could alternatively be flat or convex.

While the embodiment of FIG. 2 depicts the upper portion 110, center portion 115 and lower portion 120 as three distinct flat panels angled from one another, other configurations could be utilized to extend the upper portion 110 and lower portion 120 forward of the mat 135. For example, the media wall 105 could be formed as a single piece having the general shape depicted in FIG. 2. Alternatively, the media wall 105 could have a concave curvilinear shape with no distinct transitions between the upper portion 110, center portion 115 and lower portion 120.

Figure 3A:
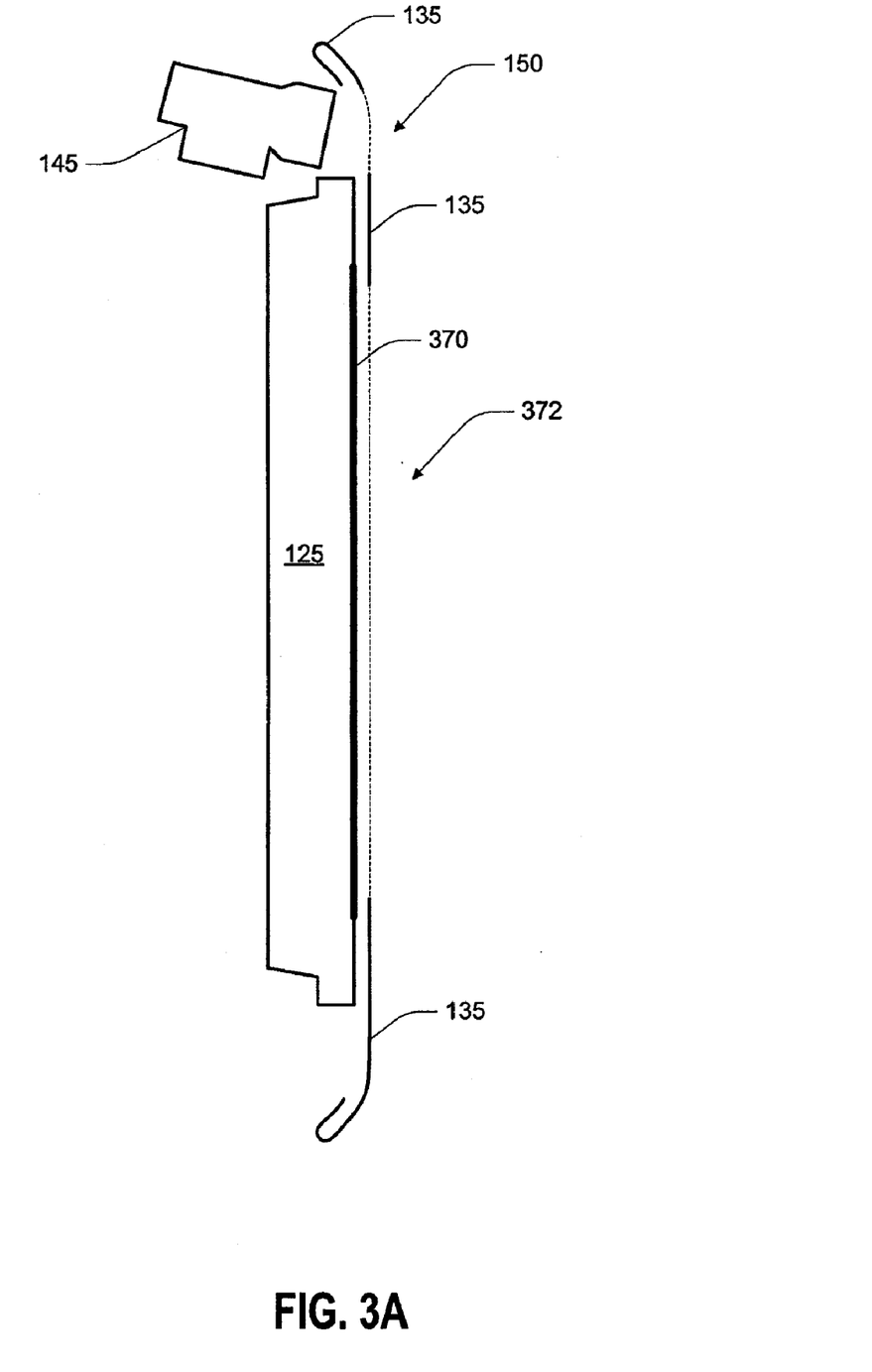
FIGS. 3A-3B are conceptual cross-sectional views of a portion of a media wall in accordance with an embodiment.
Figure 3B:
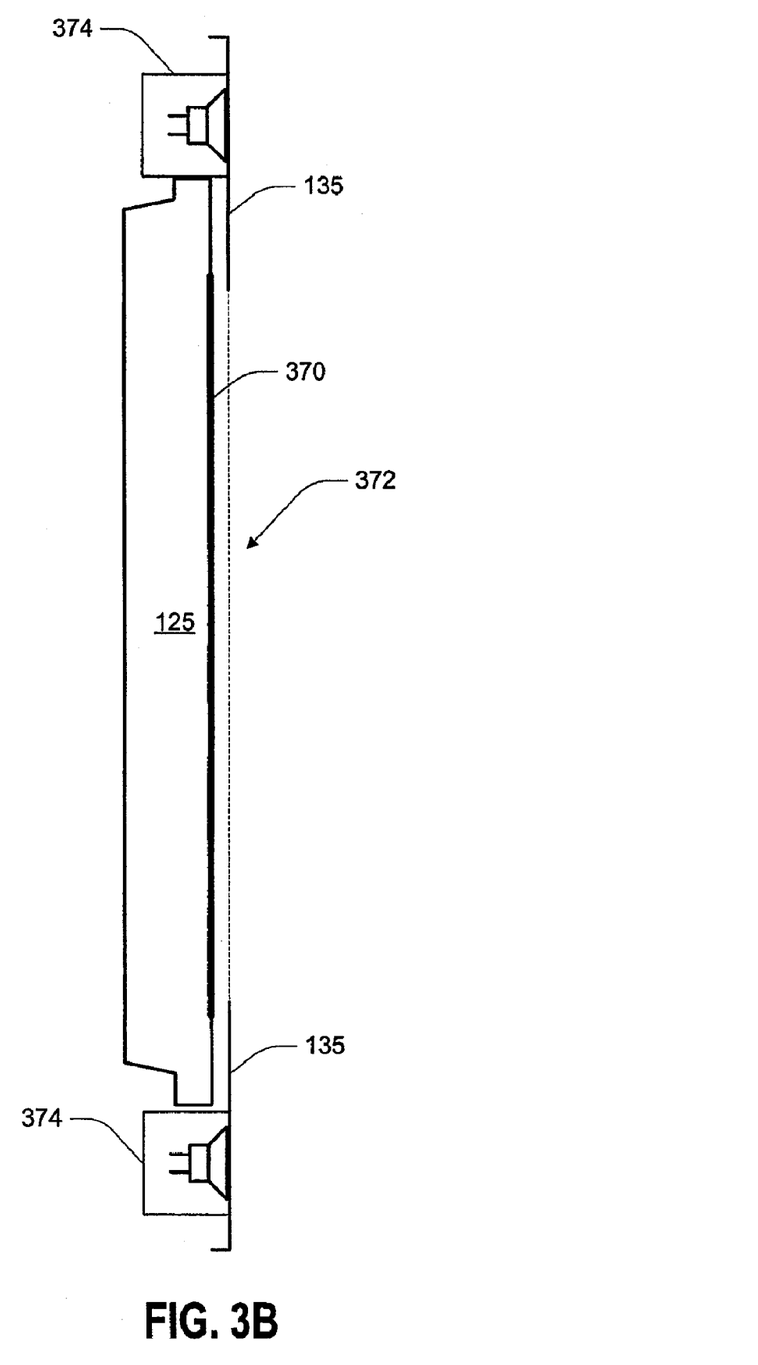

FIG. 3A is a conceptual cross-sectional view of a portion of the media wall 105 of FIG. 1 taken along line A-A' in accordance with an embodiment. As shown in FIG. 3A, the mat 135 has an opening 372 (defined by the inner perimeter 140 of FIG. 1) for viewing a viewing surface or screen 370 of the video display 125. FIG. 3B is a conceptual cross-sectional view of a portion of the media wall 105 of FIG. 1 taken along line B-B' in accordance with an embodiment. As shown in FIG. 3B, one or more audio devices or speakers 374 may be positioned behind the mat 135.

Figure 4A:
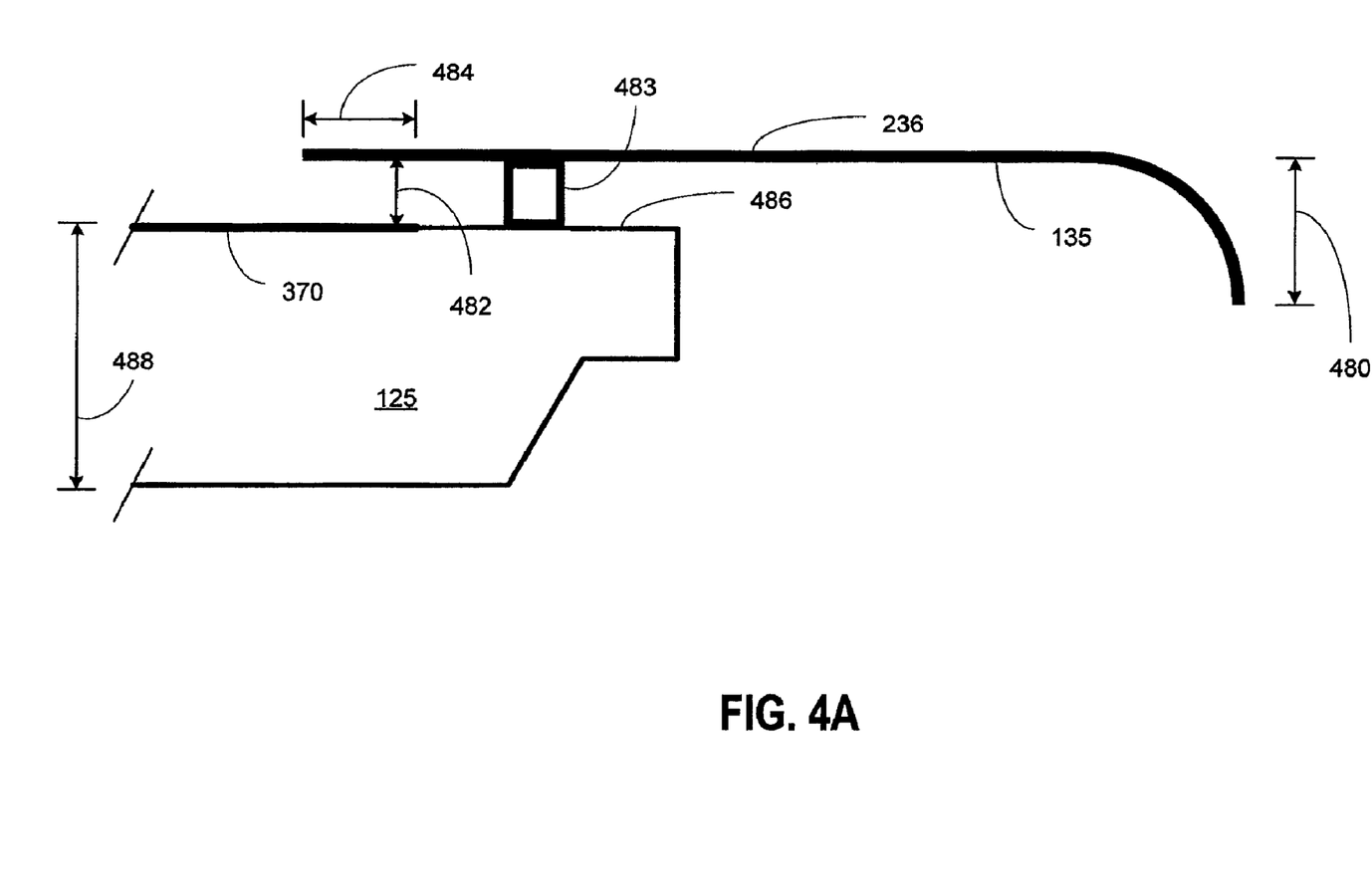
FIGS. 4A-4B are depictions of the relationship between a mat and a video display in accordance with various embodiments.

FIG. 4A is a depiction of the relationship between the mat 135 and the video display 125 in accordance with an embodiment. Mat 135 is positioned in front of the video display 125 and separated from the screen 370 of the video display 125 by a distance 482, forming an air gap. The distance 482 is sufficient to form a visible separation or air gap between the screen 370 and the mat 135. The face of the mat 135 is positioned a distance 480 from a portion of the media wall 105 (either upper portion 110 or lower portion 120—not depicted in FIG. 4A). The screen 370 of the video display 125 is positioned a distance 488 from center portion 115 of the media wall (not depicted in FIG. 4A). For one embodiment, the distance 482 is less than the distance 488. For a further embodiment, the distance 482 is less than half the distance 488. For a still further embodiment, the distance 482 is less than half the distance 480. For one embodiment, the distance 482 is less than about 2 cm. For another embodiment, the distance 482 is approximately 3-15 mm.

Color may be used to promote the appearance that the mat 135 floats in front of the screen 370 of the video display 125. For example, the media wall 105 may be in cool to neutral colors while the mat 135 may be in warm to neutral colors as warmer colors tend to come forward visually. Alternatively, color shades could be used. For example, the mat 135 could be a darker shade of the same color used for the screen 370 and/or bezel 486 of the video display 125.

For the embodiment depicted in FIG. 4A, the mat 135 extends beyond an edge of the screen 370 of the video display 125, i.e., dimensions of the viewing surface of the video display 125 are larger than dimensions of the inner perimeter of the mat 135 such that a portion of the screen 370 is positioned behind the face 236 of the mat 135. For one embodiment, edges of the screen 370 and the video display bezel 486 extend sufficiently back from the inner perimeter of the mat 135 such that the edges of the screen 370 are not visible to a casual viewer of the video display 125. For example, if the viewing angle of the video display is 120°, a casual viewer would not be expected to be viewing the video display 125 outside this angle as the screen image would not be discernible. For one embodiment, edges of the screen 370 are not visible from a viewing angle of 60% from perpendicular with the screen 370. For embodiments where edges of the screen 370 are visible behind the face 236 of the mat 135, i.e., where distance 484 is sufficiently small or negative, bezel 486 of the video display 125 may be visible. For one embodiment, where bezel 486 is visible to a viewer of the video display 125, the bezel 486 is the same color as the mat 135. For a further embodiment, the bezel 486 is a lighter shade of the color of the mat 135.

The mat 135 may be positioned apart from the screen 370 of the video display by one or more support structures. For example, a spacer 483 might be used to govern the distance 482. For one embodiment, any support structures 483 or the like are positioned such that they are not visible to a casual viewer of the video display 125. This further promotes the appearance that the mat 135 is floating above the screen 370.

Figure 4B:
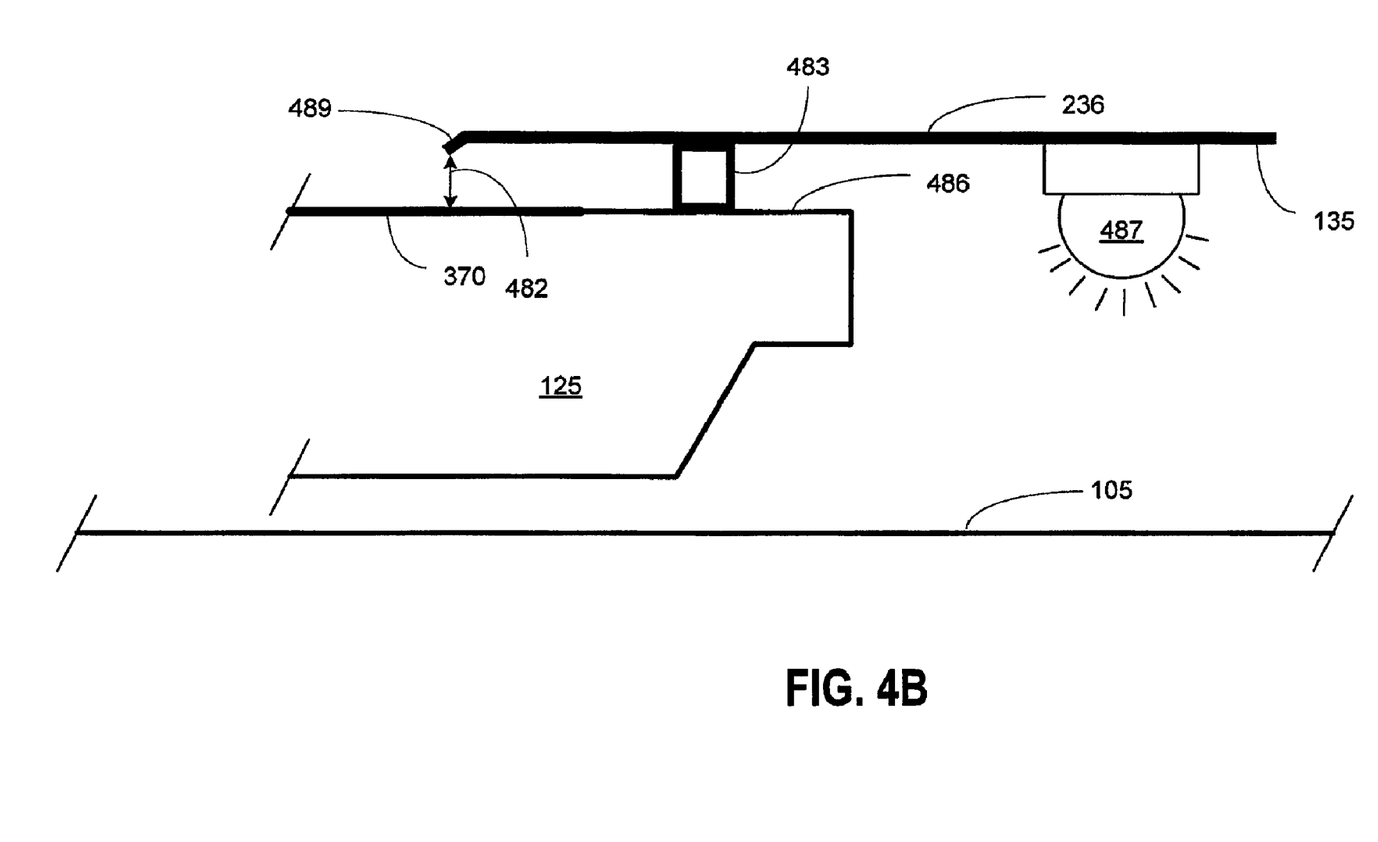

FIG. 4B is a depiction of the relationship between the mat 135 and the video display 125 in accordance with a further embodiment. FIG. 4B depicts a light 487 that may be included to provide illumination between the mat 135 and a background surface, such as media wall 105. One or more lights 487 may be included between the mat 135 and the background surface. Examples of lights 487 may include fluorescent lights, incandescent lights, a strip of LEDs, a strip tungsten lighting, etc. For one embodiment, the lights 487 are directed toward the background surface. The lights 487 may be included only along the sides of the mat 135 or may be further included along the top and bottom of the mat 135. For one embodiment, the illumination of the lights 487 is at a level equal to or less than an illumination of the screen 370. For another embodiment, the color of the illumination of the lights 487 corresponds to ambient illumination. For example, the color of the illumination of the lights 487 may correspond to the color temperature of standard office fluorescent lighting. For a further embodiment, the color of the illumination of the lights 487 corresponds to a color balance of the video display 125, i.e., the nominal hardware color setting of the video display 125. For a still further embodiment, the color of the illumination of the lights 487 is variable and corresponds to an average image color being displayed on the screen 370. FIG. 4B further depicts that the mat 135 may include a beveled edge 489 receding toward the screen 370. The average image color being displayed on the screen 370 may be determined from image data provided to the video display 125 for generation of the image.

Figure 5:
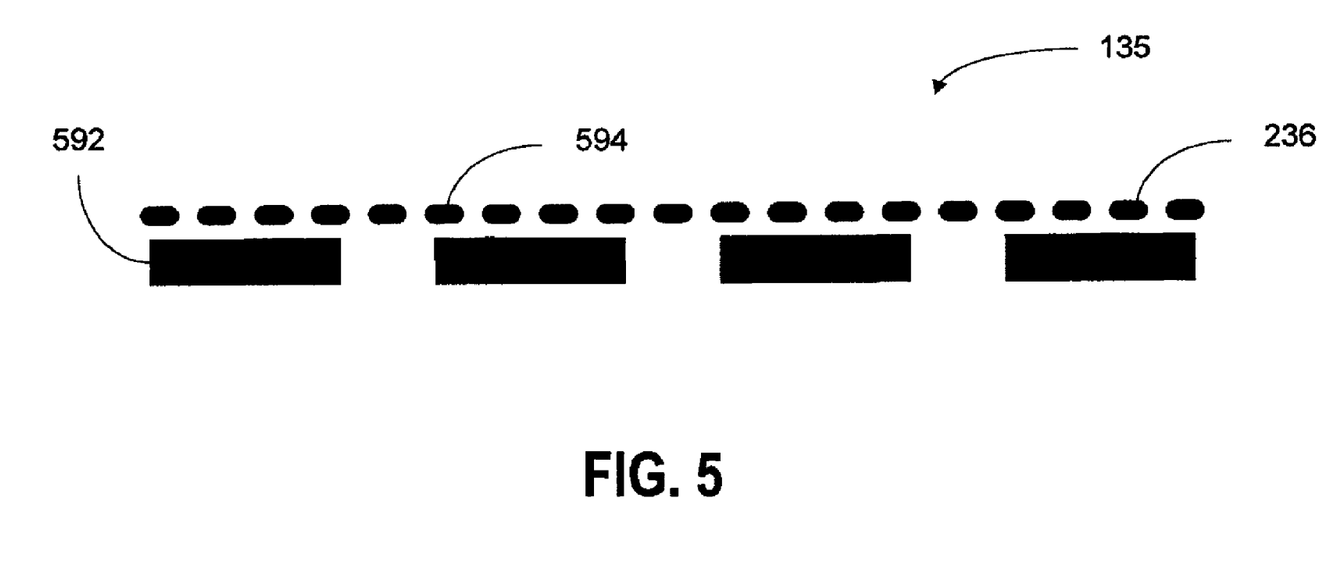
FIG. 5 is a depiction of a construction of a mat in accordance with an embodiment.

FIG. 5 is a depiction of a construction of a mat 135 in accordance with an embodiment. The mat 135 includes an acoustically-transparent support structure, such as a perforated metal plate 592. An acoustically-transparent covering, such as acoustically-transparent fabric 594 is attached to the support structure 592 on the face 236 of the mat 135. For one embodiment, the acoustically-transparent covering 594 is visually opaque. In this manner, speakers 374 located behind the mat 135 will not be significantly hindered in delivering audio information into a room containing the media wall 105, but the speakers 374 will remain hidden from view behind the opaque covering.

What is claimed is:

1. A telepresence display configuration, comprising:
a video display having a viewing surface;
a mat overlying and spaced apart from the viewing surface by one or more support structures between the video display and the mat, and having an opening having an inner perimeter configured to frame the viewing surface;
wherein dimensions of the inner perimeter are smaller than dimensions of the viewing surface; and
wherein no support structures between the video display and the mat are visible to a casual viewer of the video display through the inner perimeter of the mat.

2. The display configuration of claim 1, wherein the mat has an upper edge receding toward a background surface for the video display and a lower edge receding toward the background surface for the video display.

3. The display configuration of claim 1, wherein the mat is spaced apart from the video display by a distance such that edges of the viewing surface are not visible to the casual viewer.

4. The display configuration of claim 1, further comprising one or more lights positioned between the mat and a background surface of the video display and directed toward the background surface.

5. The display configuration of claim 4, wherein a color of illumination of the one or more lights is selected to correspond to a color from the group consisting of a color of ambient lighting, a color balance of the video display and an average color of an image displayed on the video display.

6. The display configuration of claim 1, wherein the mat comprises an acoustically-transparent support structure having an acoustically-transparent and visually-opaque covering.

7. The display configuration of claim 6, further comprising one or more speakers positioned behind the mat.

8. The display configuration of claim 1, wherein a color of the mat is warmer than a color of a background surface.

9. The display configuration of claim 1, further comprising:
a background surface having an upper portion, a center portion and a lower portion;
wherein the video display is located in front of the center portion; and
wherein the upper portion and the lower portion each incline forward at an acute angle from the center portion.

10. The display configuration of claim 9, wherein the acute angle is between 10° and 30°.

11. The display configuration of claim 9, wherein the mat has an upper edge receding toward the upper portion of the background surface and a lower edge receding toward the lower portion of the background surface.

12. The display configuration of claim 1, further comprising a camera positioned above the video display.

13. The display configuration of claim 12, wherein the camera is positioned behind the mat and wherein the mat includes an opening for the camera.

14. The display configuration of claim 1, wherein the mat has a beveled edge on its inner perimeter receding toward the viewing surface.

15. A telepresence display configuration, comprising:
a media wall, comprising a center portion, a lower portion and an upper portion;
a video display located in front of the center portion;
a mat spaced apart from the video display and having an opening having an inner perimeter configured to frame a viewing surface of a video display;
wherein the mat is located in front of the video display;
wherein the lower portion and the upper portion of the media wall each incline from the center portion of the media wall by an acute angle;
wherein the lower portion and the upper portion of the media wall each extend forward of a face of the mat; and
wherein the mat has an upper edge receding toward the upper portion of the media wall and a lower edge receding toward the lower portion of the media wall.

16. The display configuration of claim 15, wherein the bezel is spaced apart from the video display by a distance of approximately 3 mm to 15 mm.

17. The display configuration of claim 15, wherein any support structures between the mat and the video display are set sufficiently back from the inner perimeter of the mat as to not be visible to a casual viewer of the video display.

18. A telepresence display configuration, comprising:
a media wall, comprising a center portion, a lower portion and an upper portion;
a video display located in front of the center portion;
a mat spaced apart from the video display and having an opening having an inner perimeter configured to frame a viewing surface of a video display;
wherein the lower portion and the upper portion of the media wall each incline from the center portion of the media wall by an acute angle;
wherein the lower portion and the upper portion of the media wall each extend forward of a face of the mat;
wherein the mat has an upper edge receding toward the upper portion of the media wall and a lower edge receding toward the lower portion of the media wall; and
wherein the mat comprises an acoustically-transparent support structure having an acoustically-transparent and visually-opaque covering.

19. The display configuration of claim 15, wherein a color of the mat is darker than a color of the media wall, a screen of the video display or a bezel of the video display.

20. The display configuration of claim 15, wherein the acute angle is between 10° and 30°.

* * * * *

UNITED STATES PATENT AND TRADEMARK OFFICE
CERTIFICATE OF CORRECTION

PATENT NO. : 8,363,088 B2  
APPLICATION NO. : 12/263329  
DATED : January 29, 2013  
INVENTOR(S) : Mike Derocher et al.

Page 1 of 1

It is certified that error appears in the above-identified patent and that said Letters Patent is hereby corrected as shown below:

In the Claims:

In column 5, line 29, in Claim 1, after "and" delete "having" and insert -- has --, therefor.

In column 6, line 22, in Claim 15, delete "having" and insert -- has --, therefor.

In column 6, line 44, in Claim 18, delete "having" and insert -- has --, therefor.

Signed and Sealed this  
Twenty-eighth Day of May, 2013

Teresa Stanek Rea  
*Acting Director of the United States Patent and Trademark Office*